US008956154B2

(12) United States Patent
Siljan

(10) Patent No.: US 8,956,154 B2
(45) Date of Patent: Feb. 17, 2015

(54) METHOD AND SYSTEM FOR ENERGY EFFICIENT CONVERSION OF A CARBON CONTAINING FUEL TO CO2 AND H2O

(75) Inventor: Martin Siljan, Hovik (NO)

(73) Assignee: Nebb Engineering AS, Asker (NO)

( * ) Notice: Subject to any disclaimer, the term of this patent is extended or adjusted under 35 U.S.C. 154(b) by 691 days.

(21) Appl. No.: 13/270,388

(22) Filed: Oct. 11, 2011

(65) Prior Publication Data
US 2012/0129110 A1 May 24, 2012

(30) Foreign Application Priority Data

Nov. 23, 2010 (GB) .................................. 1019856.2

(51) Int. Cl.
*F23D 3/40* (2006.01)
*F23L 7/00* (2006.01)
(Continued)

(52) U.S. Cl.
CPC . *F23L 7/007* (2013.01); *C01B 3/36* (2013.01); *C01B 13/0251* (2013.01); *F01K 23/067* (2013.01); *F02C 1/05* (2013.01); *F02C 6/18* (2013.01); *F23C 6/042* (2013.01); *C01B 2203/84* (2013.01); *F05D 2260/61* (2013.01); *F23C 2900/99011* (2013.01); *Y02E 20/18* (2013.01); *Y02E 20/344* (2013.01)
USPC ................. 431/326; 431/328; 431/2; 431/11; 431/12; 95/45; 95/50; 95/54; 96/4; 96/7

(58) Field of Classification Search
CPC .... B01D 53/22; B01D 53/225; B01D 53/226; B01D 53/229; C01B 13/0251; F23L 7/007

USPC ......... 431/2, 11, 12, 215, 253, 356, 326–329; 95/45, 50, 54, 122; 96/4, 7, 9
See application file for complete search history.

(56) References Cited

U.S. PATENT DOCUMENTS 5,108,465 A * 4/1992 Bauer et al. ...................... 95/54
5,314,528 A * 5/1994 Monereau ......................... 95/55
(Continued)

FOREIGN PATENT DOCUMENTS

WO           0033942 A1    6/2000
WO    WO 0179754 A1 *   10/2001
WO     2008/074181 A1    6/2008

OTHER PUBLICATIONS

Search Report for British Application No. 1019856.2 dated Jan. 5, 2011 (1 page).

*Primary Examiner* — Jorge Pereiro
(74) *Attorney, Agent, or Firm* — Osha Liang LLP

(57) ABSTRACT

Methods and systems for conversion of a carbon containing fuel to $CO_2$ and $H_2O$. An air stream is fed to a first ion transport membrane unit obtaining a pure oxygen stream from a permeate side and an air stream with a reduced oxygen content from a retentate side. The air stream with a reduced oxygen content is fed to a second ion transport membrane unit and a gaseous first carbon containing fuel is fed to a permeate side of the second ion transport membrane. The first carbon containing fuel is reacted with oxygen transported through the second ion transport membrane forming an at least partially combusted first fuel. The at least partially combusted first fuel, at least a part of the pure oxygen stream and optionally a second carbon containing fuel is fed to a combustion chamber for combustion. An exhaust stream comprising essentially $CO_2$ and $H_2O$ is obtained.

14 Claims, 4 Drawing Sheets

(51) Int. Cl.
  *C01B 3/36* (2006.01)
  *C01B 13/02* (2006.01)
  *F01K 23/06* (2006.01)
  *F02C 1/05* (2006.01)
  *F02C 6/18* (2006.01)
  *F23C 6/04* (2006.01)

(56) References Cited

U.S. PATENT DOCUMENTS

| | | | |
|---|---|---|---|
| 5,447,555 A * | 9/1995 | Ye et al. | 95/54 |
| 5,944,874 A * | 8/1999 | Prasad et al. | 95/54 |
| 5,976,223 A | 11/1999 | Prasad et al. | |
| 6,510,693 B2 * | 1/2003 | Winkler et al. | 60/649 |
| 6,767,527 B1 * | 7/2004 | Åsen et al. | 423/437.1 |
| 7,122,072 B2 * | 10/2006 | Carolan et al. | 95/54 |
| 7,208,239 B2 * | 4/2007 | Hoffjann et al. | 429/411 |
| 8,246,719 B2 * | 8/2012 | Carolan et al. | 95/54 |
| 8,287,762 B2 * | 10/2012 | Repasky | 252/373 |
| 2002/0078906 A1 | 6/2002 | Prasad et al. | |
| 2002/0124558 A1 * | 9/2002 | Winkler et al. | 60/311 |
| 2004/0043276 A1 * | 3/2004 | Hoffjann et al. | 429/34 |
| 2004/0128975 A1 | 7/2004 | Viteri | |
| 2010/0126137 A1 * | 5/2010 | Hamrin | 60/39.461 |
| 2011/0240924 A1 * | 10/2011 | Repasky | 252/373 |

* cited by examiner

METHOD AND SYSTEM FOR ENERGY EFFICIENT CONVERSION OF A CARBON CONTAINING FUEL TO CO2 AND H2O

CROSS-REFERENCE TO RELATED APPLICATIONS

The present application claims priority from United Kingdom Patent Application No. 1019856.2, filed Nov. 23, 2010. The contents of the priority application are hereby incorporated by reference in their entirety.

BACKGROUND OF INVENTION

In recent years there have been an increased focus on capturing carbon dioxide emissions from power production based on combustion of carbon containing fuels. The emission of carbon dioxide is being considered to play an important role as a greenhouse gas and thereby influence global warming. Three main concepts have been developed to capture carbon dioxide called post-combustion, pre-combustion and oxy-fuel. Post-combustion is based on separation of carbon dioxide from exhaust from a traditional combustion process. Pre-combustion is based on transforming hydrocarbon fuel to a non-carbon containing fuel, such as hydrogen, which can be combusted without formation of carbon dioxide. The main idea of the oxy-fuel concept is to perform the combustion of a carbon containing fuel using pure oxygen and thereby obtaining an exhaust mainly comprising carbon dioxide and water. The separation of carbon dioxide and water is not very power demanding compared to the other separations. The present invention aims at provide an improved oxy-fuel based process and power plant. The water present in the exhaust gas from an oxy-fuel plant can be removed trough condensation creating a pure carbon dioxide stream applicable for storing or reuse in other processes including injection in geological formations for enhanced natural gas or oil recovery.

The oxy-fuel concept depends on the formation of pure oxygen which at present is an energy demanding process that limits the total energy efficiency of an oxy-fuel power plant. The aim of the present invention is to provide a process and a power plant with increased energy efficiency due to more energy efficient oxygen production.

Oxygen production based on membrane separation has during the later years received attention as an applicable and economically promising solution for the oxy-fuel process. Recently, there has been a rapid development of Ion Transport Membranes (ITM's) both for pure oxygen production and for applications with an oxygen consuming reaction on the permeate side.

If pure oxygen is to be produced in an ITM, there must always be a higher partial pressure of oxygen on the feed side than on the permeate side to maintain a positive flux. The difference in partial pressure constitutes the driving force of the separation. This means that if a main portion of the oxygen in the feed air is to be used in such a configuration, the air feed stream must be highly compressed, or a vacuum must be created on the permeate side.

In an ITM process, air is fed to the feed side of the membrane. The oxygen partial pressure in pure air is approximately 21% of the total pressure in the air. The partial pressure of oxygen on the permeate side must be lower than on the feed side to create a positive flux, and a high pressure difference is required for a high flux. This can be achieved by either a vacuum pump on the permeate side, a sweep stream on the permeate side, by compressing the feed air or by having an oxygen consuming reaction on the permeate side. Lowering of the energy demand for oxygen production results in an increase in the total energy efficiency of an oxy-fuel based power plant. During the ITM process the driving force, that is to say the difference in partial pressure over the membrane, is decreased as the partial pressure on the feed side is reduced when oxygen is transferred to the permeate side.

For ITM's to have an applicable efficiency, the temperature of the membrane and the incoming oxygen source should be increased, which is a power demanding process.

WO00/33942 discloses a method for recovering $CO_2$ comprising oxygen separation from a series of mixed conducting membranes. To increase the driving force over the membranes, a sweep gas is used on the permeate side to remove the oxygen. The sweep gas loaded with oxygen is in a separate step fed to a combustion chamber where the oxygen is reacted with a carbon containing fuel. The exhaust gas from a first combustion chamber is used as sweep gas in the next membrane separation unit.

US2004/0128975 describes a low pollution power generation system involving air separation. In one embodiment air separation is obtained through a combination of membranes. Here air is separated in a first membrane unit creating an oxygen rich stream and a nitrogen rich stream. The nitrogen rich stream is introduced to the feed side of a second membrane unit creating a super rich nitrogen stream and an oxygen comprising rest stream. The oxygen comprising rest stream is returned and mixed with the incoming air stream. The rich oxygen stream is passed from the first membrane unit to the feed side of a third membrane unit creating a super rich oxygen stream and a nitrogen containing rest stream which is returned and mixed with the incoming air stream.

WO2008/074181 discloses selective oxygen-permeable membranes. In one embodiment the oxygen membrane is part of a reactor comprising two zones separated by the membrane. Oxygen containing gas is fed to the first zone and a reactant, such as a hydrocarbon, is fed to the second zone. Oxygen passes the membrane and reacts with the reactant. The reaction of oxygen with the reactant lowers the oxygen partial pressure in the second zone.

When having an oxygen consuming reaction on the permeate side then the feed side becomes oxygen depleted and the oxygen partial pressure on the feed side is reduced. In an oxy-fuel power process, it is advantageous to have higher temperature after the combustion to increase the overall efficiency of the process (according to Carnot's principle). The temperature should be as high as the turbine permits. However ITM's have temperature limitations of around 1000° C., so that if the combustion process where to be performed on the permeate side of an ITM, the low combustion temperature would result in a decrease in the total energy efficiency of the system.

SUMMARY OF INVENTION

One aim of the present invention is to improve the energy efficiency of an oxy-fuel based power generation process with an improved use of ion transport membranes without limiting the temperature of the combustion process.

A further aim is to reduce the power cost for the air separation.

The present inventors solved the disadvantages with the existing solutions by offering a combination of two serial ITM stages where the first stage is a pressure driven ITM that generates pure oxygen for a separate possibly high temperature combustion process whereas the partly oxygen depleted air is further depleted in a second ITM with a oxygen consuming combustion process on the permeate side.

The present invention provides a two-stage membrane process that is integrated with an oxy-fuel power process in such a way that it combines advantages of the two ITM types (without reaction and with a oxygen consuming reaction) to increase the overall efficiency of the power production process, and thus reduce the power penalty of the $O_2$ production which facilitates the $CO_2$ capture.

Accordingly in a first aspect the present invention provides a method for conversion of a carbon containing fuel to $CO_2$ and $H_2O$ comprising feeding an air stream to a first ion transport membrane unit comprising a first membrane, a permeate side and a retentate side, obtaining a pure oxygen stream from the permeate side and an air stream with a reduced oxygen content from the retentate side, characterised in that the method further comprises feeding the air stream with a reduced oxygen content to a second ion transport membrane unit comprising a second membrane, a permeate side and a retentate side, feeding a gaseous first carbon containing fuel to the permeate side of the second ion transport membrane, reacting the first carbon containing fuel within the second ion transport membrane unit with oxygen transported through the second ion transport membrane forming an at least partially combusted first fuel, feeding the at least partially combusted first fuel, and at least a part of the pure oxygen stream to a combustion chamber for combustion, and obtaining an exhaust stream comprising essentially $CO_2$ and $H_2O$, as herein defined. Power can be generated by expanding the exhaust stream, and heat can be recovered from the expanded exhaust.

In one aspect of the invention the method further comprises feeding a second carbon containing fuel to said combustion chamber for combustion.

In a first embodiment of the present invention the first carbon containing fuel is only partially combusted in the second membrane unit and the partially combusted first carbon containing fuel is utilized as the second carbon containing fuel.

In a second embodiment the first carbon containing fuel fed to the permeate side of the second ion transport membrane is fully combusted in the second ion transport membrane.

In an aspect of the present invention the method comprises preheating the air stream upstream the first ion transport membrane unit. In one embodiment heat energy for the preheating is provided by combusting a third carbon containing fuel with a part of the pure oxygen generating a third exhaust stream and combining the third exhaust stream with the exhaust stream.

In a different embodiment the heat energy for the preheating is obtained by gasifying coal, petcoke or biomass to syngas with a part of the pure oxygen and utilizing the syngas as the gaseous first carbon containing fuel.

According to another aspect the present invention provides a system for conversion of a carbon containing fuel to $CO_2$ and $H_2O$ comprising a first ion transport membrane unit with an air inlet and an outlet for air with reduced oxygen content both in fluid communication with a retentate side of the first ion transport membrane, and a pure oxygen outlet in communication with a permeate side, characterised in that the system further comprises a second ion transport membrane with an inlet on a retentate side in fluid communication with the outlet for air with reduced oxygen content and an outlet on the retentate side for air with a more reduced oxygen content, a first carbon containing fuel inlet on a permeate side and an at least partially combusted fuel outlet in communication with the permeate side, a combustion chamber with one or more inlets in fluid communication with the pure oxygen outlet and the at least partially combusted fuel outlet, and an exhaust outlet for generated $CO_2$ and $H_2O$.

In one aspect the system according to the invention further comprises a gas turbine for expanding the exhaust and generate power and a Heat Recovery Steam Generation (HRSG) system for extracting heat energy.

In one embodiment the combustion chamber further comprises a fuel inlet for a second carbon containing fuel.

Further the system according to the present invention can comprise a preheater for preheating air comprising a pure oxygen inlet in fluid communication with the pure oxygen outlet, an inlet for carbon containing fuel and an exhaust outlet in fluid communication with the exhaust outlet from the combustion chamber.

In another embodiment the system may further comprise a gasifier for producing syngas comprising a pure oxygen inlet in fluid communication with the pure oxygen outlet, an inlet for coal, petcoke or biomass and a syngas outlet in fluid communication with the first carbon containing fuel inlet on the permeate side of the second ion transport unit. In one aspect of this embodiment the system further comprises a preheater for preheating air where the preheater is a heat exchanger heated by the syngas.

According to the present invention the first stage pure oxygen generation is discontinued when the costs increases due to decreased partial oxygen pressure on the retentate side. The separation of oxygen is continued in the second stage where the driving force is increased by an oxygen consuming reaction on the permeate side.

BRIEF DESCRIPTION OF DRAWINGS

The present invention will be discussed in further detail with reference to the enclosed figures where.

Figure 1:
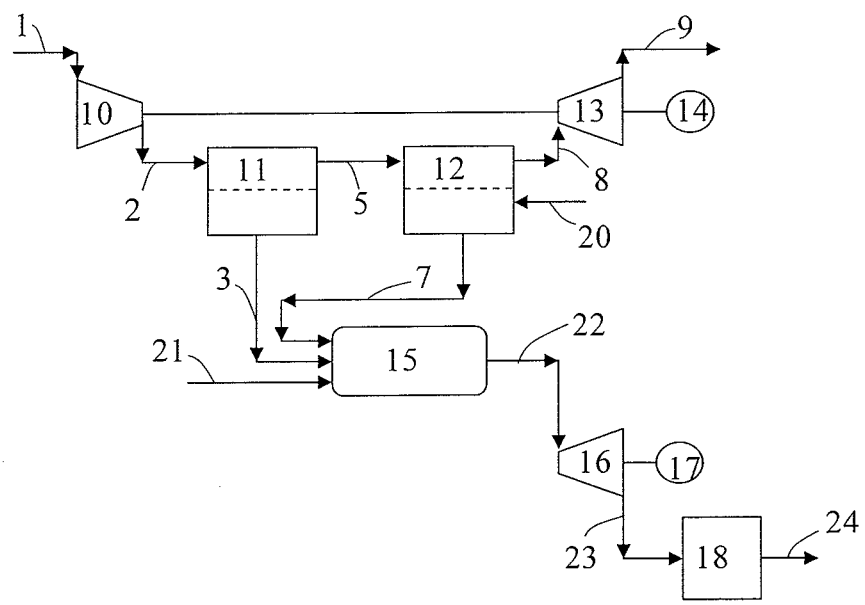
FIG. 1: Illustrates a first embodiment of power generating process according to the present invention.

In the drawings equal reference signs are used for equal elements however with a change on the third digital when referring to different embodiments.

DETAILED DESCRIPTION

The term "carbon containing gaseous fuel" as used in here refers to any type of carbon containing feedstock including for example natural gas, propane or any form of syngas including syngas from gasified coal, biomass or hydrocarbons.

The term "syngas" refers to a gas mixture comprising CO and $H_2$, and possibly $CO_2$, $H_2O$ $CH_4$ and other non combusted hydrocarbons but not comprising any significant amounts of $N_2$.

The term "fully oxidized syngas" refers to a gas mixture comprising mainly $CO_2$ and $H_2O$ and only limited traces of CO, $H_2$, and $CH_4$ or other non combusted hydrocarbons but not comprising any significant amounts of $N_2$.

The expression "exhaust stream comprising essentially $CO_2$ and $H_2O$" refers to a exhaust stream which consist of at least 75% $CO_2$ and $H_2O$ or in other words an exhaust stream that comprises less than 25% other compounds, preferably less than 10% other compounds than $CO_2$ and $H_2O$, and in one embodiment less than 5% other compounds than $CO_2$ and $H_2O$.

FIG. 1 schematically illustrates an oxy-fuel power plant according to the present invention. Air 1 is compressed in compressor 10 and feed trough conduit 2 into a first membrane unit 11. The first membrane unit comprises an ion transfer membrane (ITM). Oxygen present in the air stream is transferred through the membrane and on to the permeate side, generating a pure oxygen stream 3. The partially oxygen depleted air leaves the first membrane unit as stream 5 and enters a second membrane unit 12 comprising an ITM adapted for a oxidation reaction on the permeate side. Carbon containing fuel is feed to the permeate side through conduit 20. The carbon containing fuel reacts with oxygen transferred through the membrane and forms a partly or fully oxidized carbon containing stream 7.

Oxygen depleted air 8 leaving the second membrane unit 12 may be expanded in an air turbine 13 to utilize the compression energy. The air turbine 13 is in one embodiment of the invention coupled to the same generator/engine 14 as the air compressor 10. The expanded/decompressed oxygen depleted air is leaves the power plant as stream 9.

The obtained pure oxygen stream 3 and the partly or fully oxidized carbon containing stream 7 are feed to an oxy-fuel combustion chamber 15. Optionally additional carbon containing fuel 21 is introduced to an oxy-fuel combustion chamber 15. The amount of optional additional fuel can be adjusted to the secure fully combustion of both fuel streams by the available oxygen. The combustion results in the generation of an exhaust stream 22 mainly consisting of $CO_2$ and $H_2O$. The exhaust is expanded in an expander 16 to generate power through a generator 17. Additional energy is obtained from the expanded exhaust 23 through a conventional Heat Recovery Steam Generation (HRSG) system 18. Stream 24 leaving the HRSG comprises all generated carbon dioxide which may be stored or reused.

Figure 2:
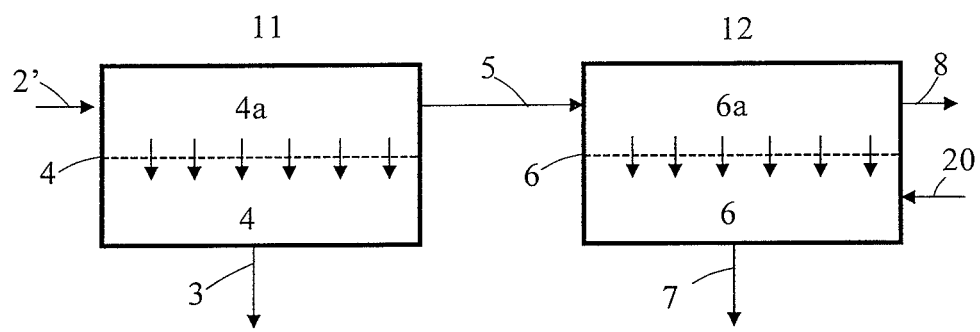
FIG. 2: Illustrates in detail the combination of to membrane process according to the present invention.

FIG. 2 illustrates in further detail the two membrane units and their operation. Air 2' is fed to the feed side 4a of an ITM unit 11 for pure oxygen production. The air can be compressed to increase the partial pressure on the feed side. Oxygen flows through the ITM 4 into the permeate side 4b of the ITM. The pure oxygen 3 is used in the combustion chamber in an oxy-fuel power process.

The partly oxygen depleted air 5 goes out from the feed side of the pure oxygen ITM into the feed side 6a of an ITM unit 12 with oxidation on the permeate side. Oxygen flows through the ITM 6 to the permeate side 6b. On the permeate side, carbon containing fuel 20 is fed. The carbon containing fuel can be for example natural gas, propane or syngas.

The carbon containing fuel reacts with the oxygen through oxidation reactions. This can be partly or full oxidation (combustion). The reaction ensures a very low oxygen partial pressure on the permeate side. This means that the flux across the membrane will be high even with the partially oxygen depleted air on the feed side. The oxidation reactions are exothermic. Thus the temperature on the permeate side can be controlled by the ratio between oxygen and fuel.

The reaction products 7 comes out from the permeate side. If the reaction products are fully oxidized, they can be used as cooling in the combustion chamber of the oxy-fuel power process. If they are only partly oxidized, they can be used as fuel in the combustion chamber.

Figure 3:
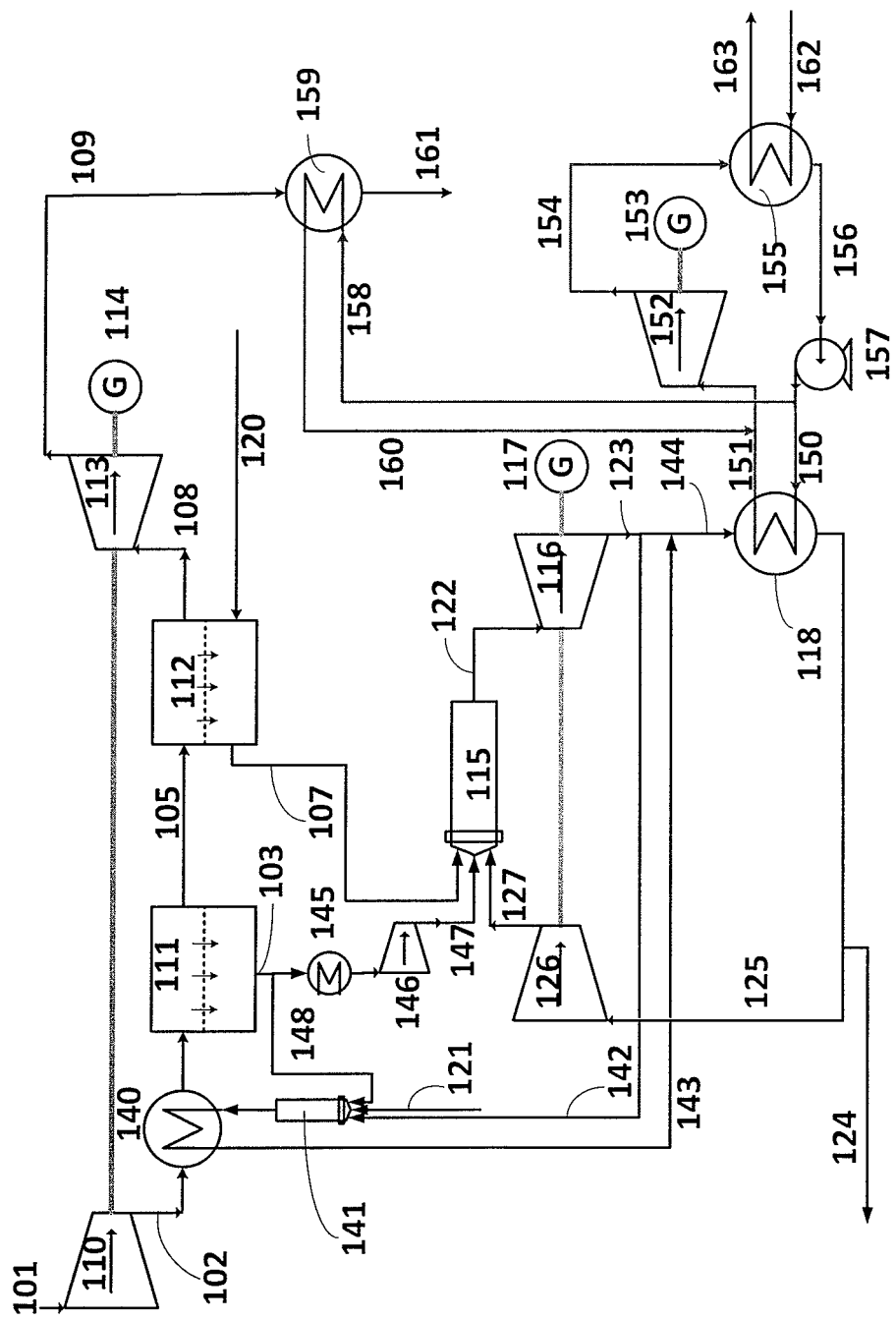
FIG. 3: Illustrates a gaseous fuel power cycle with partial oxidation in the second membrane.
Figure 4:
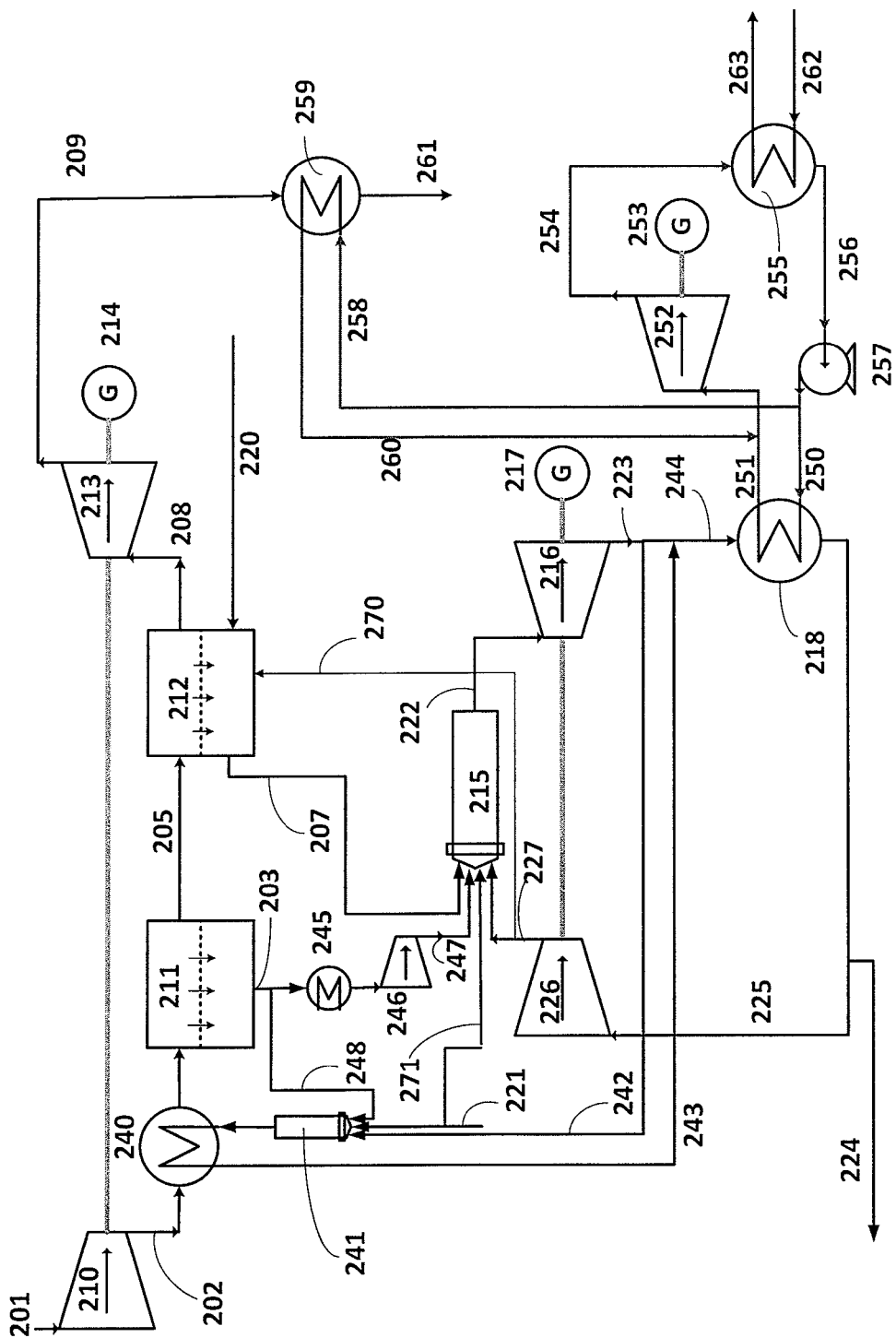
FIG. 4: Illustrates a gaseous fuel power cycle with full oxidation in the second membrane unit.
Figure 5:
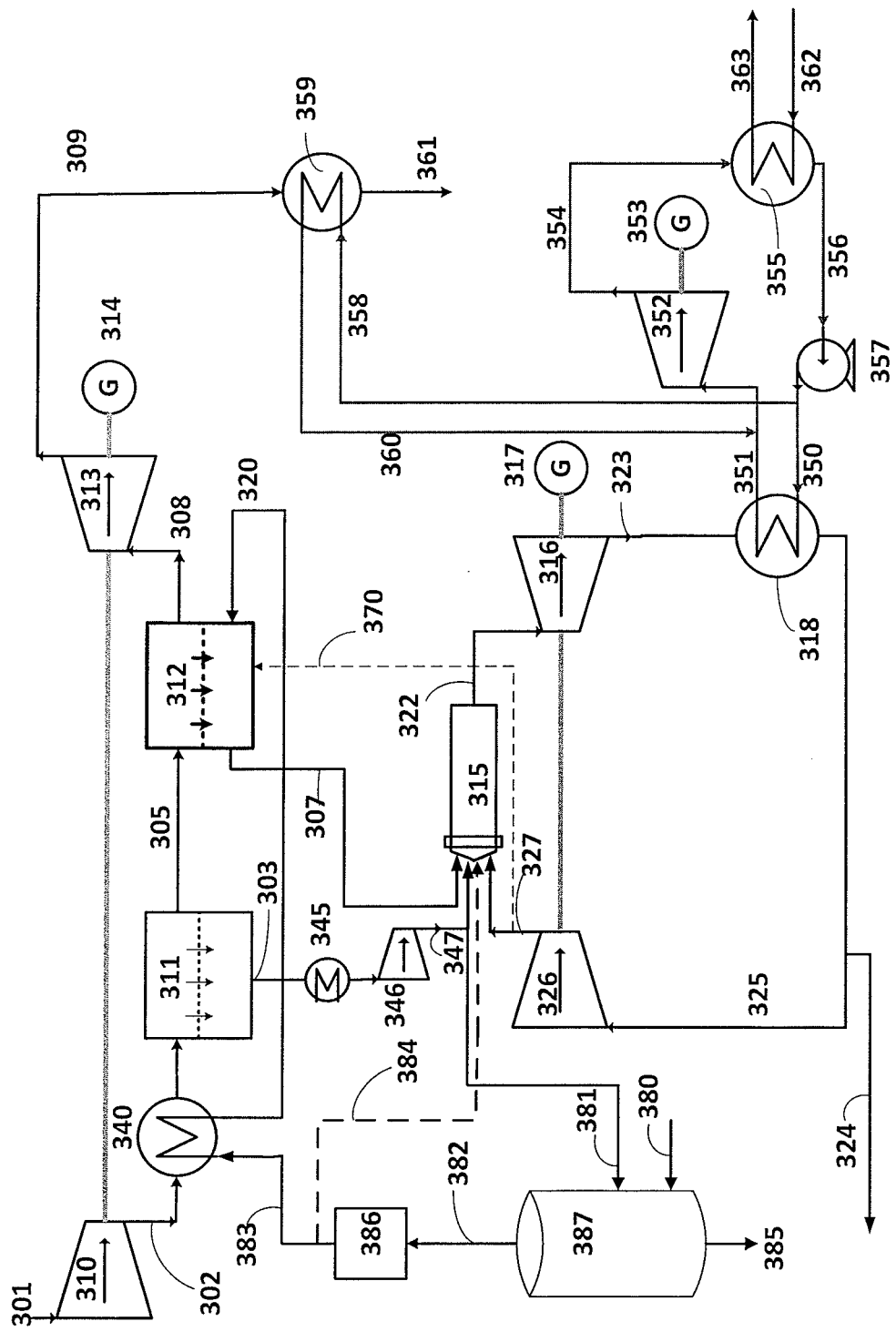
FIG. 5: Illustrates a solid fuel power process.

FIGS. 3-5 illustrate different examples of embodiments of the present invention. The overall process and the integration between the oxygen production and the oxy-fuel power process are shown.

FIG. 3 shows a process solution where the fuel gas 120 is fed to the permeate side of the second ITM unit 112. In this embodiment the fuel gas 120 is the main fuel source to the process. Partial oxidation occurs and syngas is produced, and the syngas 107 is combusted in the combustion chamber 115 with oxygen from the first ITM unit 111. In the illustrated embodiment the main part of the produced oxygen 103 is cooled in cooler 145, compressed in oxygen compressor 146 before it enters the combustion chamber in the form of compressed oxygen 147. The ability of ITM's to transport oxygen is increasing with increasing temperature and a preheating of the compressed air 102 in heat exchanger 140 therefore has a positive effect on the membrane separation processes. Heat for the heat exchanger can in one embodiment be produced in reheater 141 by reacting carbon containing fuel gas 121 with an oxygen side stream 148. In another embodiment a part 142 of the hot expanded exhaust stream 123 can be utilized as the heat source. In yet another embodiment a combination of these two embodiments are utilized. The cooled heating gas 143 can in all embodiments be returned to the main exhaust stream upstream the HRSG system.

The expanded and possibly partly cooled exhaust 144 from is introduced to the HRSG heat exchanger 118. Heat is removed and the cooled exhaust comprising generated $CO_2$ is in the illustrated embodiment split into a recycle stream 125 and a $CO_2$ exhaust stream 124. The recycle stream 125 is compressed in compressor 126 before it is fed to the combustion camber 115 as stream 127.

The $CO_2$ exhaust stream 124 can be further treated in a condenser to remove water or in a compressor to obtain a $CO_2$ by-product applicable for storing or reuse in another process. All generated $CO_2$ leaves the plant trough line 124.

The purpose and the function of the HRSG system are well known. The heat recovery of the HRSG plays an important role in increasing total energy efficiency of the power plant. Heat is transferred in the heat exchanger 118 to a water stream 150 to form steam. The heated steam is expanded in a steam turbine 152 generating power in the generator 153. The expanded steam 154 comprises heat that can be removed in a condenser/heat exchanger 155. The heat is transferred to a stream 162 forming heated stream 163 which may be low pressure steam, heated cooling water or similar. Leaving the heat exchanger 155 is a stream of water 156 which via pump 157 is returned to heat exchanger 118.

In the embodiment illustrated on FIG. 3 heat is recovered from the expanded air stream 109 by passing it through a heat exchanger 159 generating a cooled oxygen depleted air stream 161. The heat is transferred to a water stream 158 from the pump 157 to form steam which is returned to the steam stream upstream the steam turbine 152.

FIG. 4 shows a second embodiment of the present invention, where a part of the fuel is fed to the permeate side of the second ITM unit, where it is fully oxidized. The oxidation reaction produces so much heat that cooling by recycled $CO_2/H_2O$ is required. The reaction products are used as cooling medium in the oxy-fuel combustion chamber. In the second ITM unit 212 the carbon containing fuel 220 is fully oxidized to $CO_2$ and $H_2O$. To control the temperature in the second ITM unit 212a part 270 of the compressed recycled exhaust 227 is also introduced to the permeate side of the second ITM unit. The obtained fully oxidized syngas together with the recycled exhaust leaves the second ITM unit as stream 207 and is introduced to the combustion chamber 215 as cooling. Additional carbon containing fuel 271 is combusted in the combustion chamber 215 with the pure oxygen 247. The systems for preheating and power generation including heat recovery are the same as discussed in connection with FIG. 3.

FIG. 5 shows a solid fuel based third embodiment of the present invention. Coal, petcoke or biomass 380 is gasified in a gasifier 387, together with a part stream 381 of the cooled and compressed pure oxygen 347 obtained from the first ITM unit 311. Non-gasified residue leaves the gasifier as stream 385. The uncleaned syngas 382 is cleaned in gas cleaner 386. A first part 383 of the hot cleaned syngas is heat exchanged with the compressed air in heat exchanger 340 and fed to the second ITM 312 unit as carbon containing gaseous fuel 320. A second part of the cleaned syngas 384 is combusted in the combustion chamber 315. Depending on the oxidation level in the membrane permeate side of the second ITM unit 312, cooling may be required as in FIG. 4. The systems for preheating and power generation including heat recovery are the same as discussed in connection with FIG. 3.

List of reference numbers

| | |
|---|---|
| 1, 101, 201, 301 | air feed |
| 2, 102, 202, 302 | compressed air |
| 3, 103, 203, 303 | pure oxygen (permeate outflow) |
| 4 | membrane for pure oxygen production |
| 4a | feed side of pure oxygen production membrane |
| 4b | permeate side of pure oxygen membrane |
| 5, 105, 205, 305 | partly oxygen depleted air |
| 6 | membrane with oxidation on the permeate side |
| 6a | feed side of membrane with oxidation on the permeate side |
| 6b | permeate side of membrane with oxidation on the permeate side |
| 7, 107, 207, 307 | oxidized carbon containing fuel (permeate outflow from the membrane with oxidation on the permeate side) |
| 8, 108, 208, 308 | oxygen depleted air |
| 9, 109, 209, 309 | depressurized oxygen depleted air |
| 10, 110, 210, 310 | air compressor |
| 11, 111, 211, 311 | first membrane unit |
| 12, 112, 212, 312 | second membrane unit |
| 13, 113, 213, 313 | air turbine |
| 14, 114, 214, 314 | generator/engine |
| 15, 115, 215, 315 | combustion chamber |
| 16, 116, 216, 316 | expander |
| 17, 117, 217, 317 | generator |
| 18, 118, 218, 318 | HRSG, heat exchanger |
| 20, 120, 220 | carbon containing gaseous fuel |
| 21, 121, 221 | carbon containing gaseous fuel |
| 22, 122, 222, 322 | exhaust ($CO_2 + H_2O$) |
| 23, 123, 223, 323 | expanded exhaust |
| 24, 124, 224, 324 | cooled exhaust |
| 140, 240, 340 | heat exchanger |
| 141, 241 | reheater |
| 142, 242 | partial stream of expanded exhaust |
| 143, 243 | cooled heating gas |
| 144, 244 | expanded and possibly partly cooled exhaust |
| 145, 245, 345 | oxygen cooler |
| 146, 246, 346 | oxygen compressor |
| 147, 247, 347 | compressed oxygen |
| 150, 250, 350 | water |
| 151, 251, 351 | heated water/steam |
| 152, 252, 352 | steam turbine |
| 153, 253, 353 | generator |
| 154, 254, 354 | expanded steam |
| 155, 255, 355 | condenser/heat exchanger |
| 156, 256, 356 | cooled water |
| 157, 257, 357 | pump |
| 158, 258, 358 | water |
| 159, 259, 359 | heat exchanger |
| 160, 260, 360 | heated water/steam |
| 161, 261, 361 | cooled oxygen depleted air |
| 162, 262, 362 | cooling water |
| 163, 263, 363 | cooling water return/LP steam |
| 270, 370 | part of recycled exhaust |
| 271 | additional carbon containing fuel |
| 380 | coal, petcoke or biomass |
| 381 | pure oxygen |
| 382 | uncleaned syngas |
| 383 | firsts part of cleaned syngas |
| 384 | second part of cleaned syngas |
| 385 | non-gasified residues |
| 386 | gas cleaner |
| 387 | gasifier |

What is claimed is:

1. System for conversion of a carbon containing fuel to $CO_2$ and $H_2O$ comprising:
    a first ion transport membrane unit with an air inlet and an outlet for air with reduced oxygen content both in fluid communication with a retentate side of the first ion transport membrane, and a pure oxygen outlet in communication with a permeate side;
    a second ion transport membrane with an inlet on a retentate side in fluid communication with the outlet for air with reduced oxygen content and an outlet on the retentate side for air with a more reduced oxygen content, a first carbon containing fuel inlet on a permeate side and an only partially combusted fuel outlet in communication with the permeate side; and
    a combustion chamber with one or more inlets in fluid communication with the pure oxygen outlet and the only partially combusted fuel outlet, and an exhaust outlet for generated $CO_2$ and $H_2O$.

2. System according to claim 1, wherein the combustion chamber further comprises a fuel inlet for a second carbon containing fuel.

3. System according to claim 1, wherein the system further comprises a preheater for preheating air comprising a pure oxygen inlet in fluid communication with the pure oxygen outlet, an inlet for carbon containing fuel and an exhaust outlet in fluid communication with the exhaust outlet from the combustion chamber.

4. System according to claim 1, wherein the system further comprises a gasifier for producing syngas comprising a pure oxygen inlet in fluid communication with the pure oxygen outlet, an inlet for coal, petcoke or biomass and a syngas outlet in fluid communication with the first carbon containing fuel inlet on the permeate side of the second ion transport unit.

5. System according to claim 4, wherein the system further comprises a preheater for preheating air where the preheater is a heat exchanger heated by the syngas.

6. System according to claim 1, wherein the system further comprises a gas turbine for expanding the exhaust and generate power and a Heat Recovery Steam Generation system for extracting heat energy.

7. Method for conversion of a carbon containing fuel to $CO_2$ and $H_2O$ comprising:
    feeding an air stream to a first ion transport membrane unit comprising a first membrane, a permeate side and a retentate side;
    obtaining a pure oxygen stream from the permeate side and an air stream with a reduced oxygen content from the retentate side;
    feeding the air stream with a reduced oxygen content to a second ion transport membrane unit comprising a second membrane, a permeate side and a retentate side;

feeding a gaseous first carbon containing fuel to the permeate side of the second ion transport membrane;

reacting the first carbon containing fuel within the second ion transport membrane unit with oxygen transported through the second ion transport membrane forming an only partially combusted first fuel;

feeding the only partially combusted first fuel, and at least a part of the pure oxygen stream to a combustion chamber for combustion; and obtaining an exhaust stream comprising essentially $CO_2$ and $H_2O$, as hereinbefore defined.

8. Method according to claim 7, wherein the method further comprises feeding a second carbon containing fuel to said combustion chamber for combustion.

9. Method according to claim 8, wherein the first carbon containing fuel fed to the permeate side of the second ion transport membrane is fully combusted in the second ion transport membrane.

10. Method according to claim 8, wherein the method further comprises generating power by expanding the exhaust stream, and recovering heat from the expanded exhaust.

11. Method according to claim 7, wherein the method further comprises preheating the air stream upstream the first ion transport membrane unit.

12. Method according to claim 11, wherein providing heat energy for the preheating by combusting a third carbon containing fuel with a part of the pure oxygen generating a third exhaust stream and combining the third exhaust stream with the exhaust stream.

13. Method according to claim 11, wherein providing heat energy for the preheating by gasifying coal, petcoke or biomass to syngas with a part of the pure oxygen and utilizing the syngas as the gaseous first carbon containing fuel.

14. Method according to claim 1, wherein the method further comprises generating power by expanding the exhaust stream, and recovering heat from the expanded exhaust.

* * * * *